United States Patent Office 3,510,851
Patented May 5, 1970

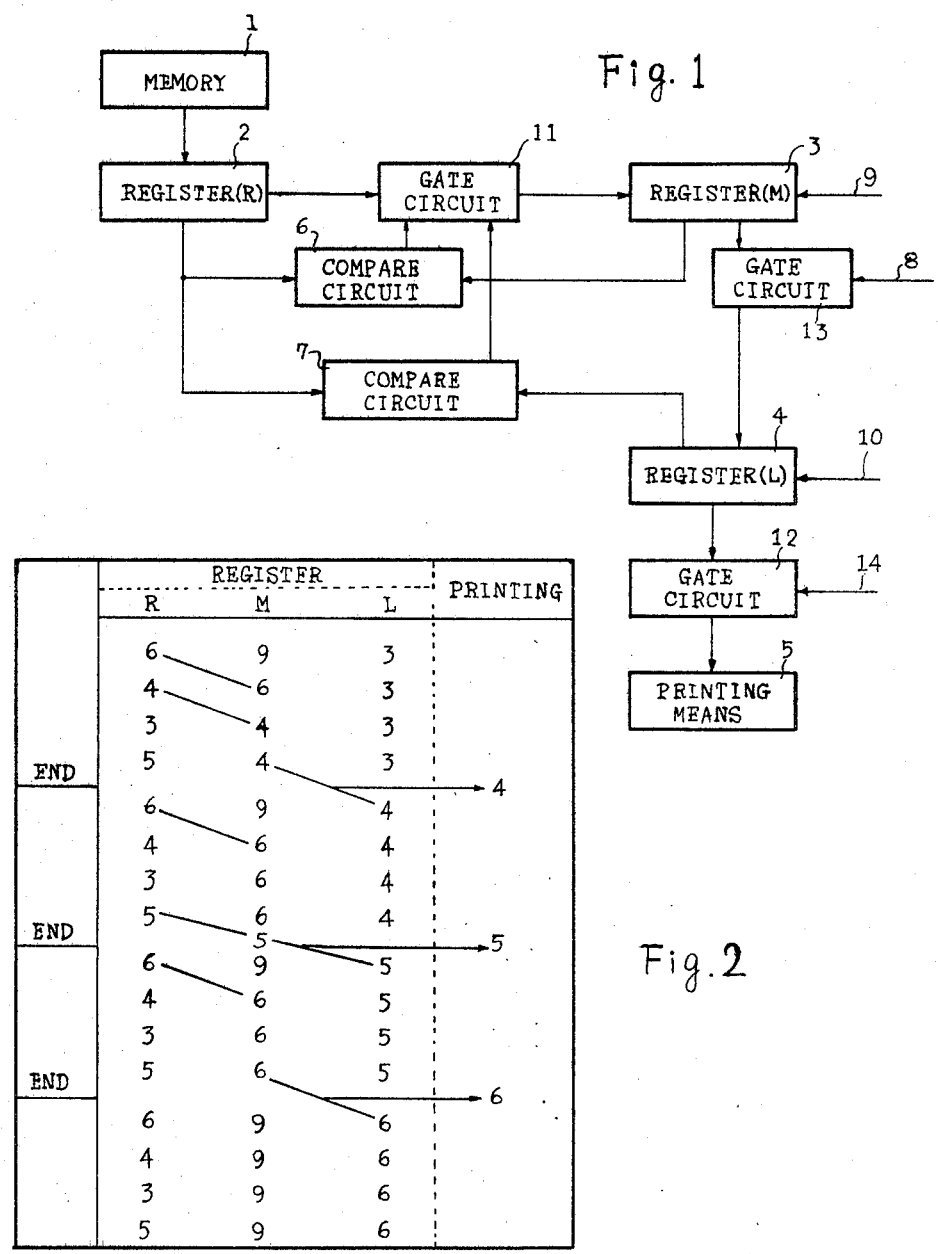

3,510,851
READOUT SYSTEM FOR NUMERICAL INFORMATION
Yukio Nakagome and Hiroichi Teramura, Tokyo-to, Tetsusaburo Kamibayashi, Niiza-machi, Kitaadachi-gun, and Naohiko Hattori and Sumitoshi Ando, Tokyo-to, Japan, assignors to Kokusai Denshin Denwa Kabushiki Kaisha, Tokyo-to, Japan, a joint-stock company of Japan
Filed Mar. 14, 1968, Ser. No. 713,038
Claims priority, application Japan, Mar. 20, 1967, 42/17,103
Int. Cl. G11c 2/00
U.S. Cl. 340—173                                  3 Claims

ABSTRACT OF THE DISCLOSURE

A system for reading out numerical information in a predetermined numerical order from a circulating memory, where a numerical signal which has the minimum difference from a predetermined one of lower and upper end limits of a range of the numerical information is detected, for each period of the grand cycle of the circulating memory, from numerical signals read out from the circulating memory. In accordance with numerical increase or decrease of the predetermined end limit at the initial time of each period of the grand cycle, a train of numerical information arranged in the increasing or decreasing numerical order is obtained by arranging successively the numerical signals detected as mentioned above.

---

This invention relates to a system for reading out numerical information in the predetermined numerical order from a serial access memory such as a circulating memory.

The conventional system of the type are generally employed to read out in a very short time a desirably ordered train of numerical information from a considerably large quantity of numerical information. In these conventional systems, it is usually necessary to provide complicated logical circuits and auxiliary memory means and to carry our complicated transfer operations of information so as to obtain a train to readout numerical information arranged in the predetermined numerical order. Accordingly, since the conventional systems have a high price and a large size, they are uneconomical if there is sufficient time to obtain the train read out in the predetermined numerical order.

An object of this invention is to provide a system of simple formation capable of reading out, in a predetermined numerical order, numerical information from a circulating memory in case of no necessity for carrying out in a very short time the readout of numerical information.

Said object and other objects of this invention can be attained by the system of this invention for reading out numerical information in a predetermined numerical order from a circulating memory, comprising a first register for storing successively numerical signals read out from the circulating memory, a second register, a third register means for establishing in a predetermined one of the second and third registers one of lower and upper end limits of a desirable readout range of the numerical information at the initial time of each period of grand cycle of the circulating memory, means for establishing in the other of the second and third registers the other of lower and upper end limits of the desirable readout range at the initial time of the readout operation of the system, a first gate means for transferring a numerical signal stored in the first register into said one of the second and third registers when the numerical signal stored in the first register is included within a range between numerical signals respectively stored in the second and third registers, a second gate means for transferring a numerical signal stored in said one of the second and third registers into the other of the second and third registers at the end of the period of the grand cycle, and a third gate means for reading out a numerical signal from the other of the second and third registers during a succeeding period of the grand cycle lasting after the end of the period of the grand cycle.

The principle of this invention will be better understood from the following more detailed discussion in conjunction with the accompanying drawings, in which:

FIG. 1 is a block diagram for illustrating an embodiment of this invention; and

FIG. 2 is a graph for describing the operation of the embodiment shown in FIG. 1.

With reference to FIG. 1, an example of this invention comprises a circulating memory 1, registers 2, 3 and 4, a printing means 5, compare circuits 6 and 7 and gate circuits 11, 12 and 13. Registered numerical signals to be corrected their order are stored at random order in the circulating memory 1. The registered numerical signals are successively read out from the memory 1 into the register 2.

The system of this invention can be applied to the readout operation of the registered numerical signals in both of increasing numerical order and decreasing numerical order. In the following, the readout operation according to increasing numerical order will first be described.

In this case of increasing numerical order, the upper limit of a desirable readout range is set in the register 3 through a write-in terminal 9 at the initial time of the period T of the grand cycle of the circulating memory 1. On one hand, the lower limit of the desirable readout range is set in the register of 4 through a write-in terminal 10 at the initial time of the readout operation of the system. If the desirable readout range is a range between numbers "4" and "9" by way of example, the upper limit to be set in the register 3 is the number "9" and the lower limit to be set in the register 4 is a number "3" smaller by "1" than the number "4" which is the minimum number of the range. The compare circuit 6 generates its output when a number "R" stored in the register 2 is smaller than a number "M" stored in the register 3. The compare circuit 7 generates its output when a number "R" stored in the register 2 is larger than a number "L" stored in the register 4. The gate circuit 11 is opened only when the outputs of the compare circuits 6 and 7 are simultaneously generated. When the gate circuit 11 is opened as mentioned above, a memory content "M" stored in the register 3 prior to this time is erased and a memory content "R" stored in the register 2 at this time is transferred to the register 3 through the gated 11 opened. The gate circuit 13 is opened by an end pulse of the grand cycle of the circulating memory 1 and employed to transfer the content "M" of the register 3 into the register 4. The end pulse is supplied to the gate circuit 13 through a gating terminal 8. The gate circuit 12 is opened by a gating pulse supplied through a gating terminal 14 at the end time of the grand cycle. This gating pulse for the gate circuit 12 is applied after the application of the end pulse for gating the gating circuit 13 and may be applied during a just succeeding period T of the grand cycle lasting the end of the preceding period of the grand cycle. When the gate circuit 12 is opened, the content "L" of the register 4 is read out through the opened gate circuit 12 to an output means, such as the printing means 5 (e.g.; teleprinter).

An actual example of the operation of this embodiment will be described with reference to FIG. 2 in case of the readout operation according to increasing numerical order. If it is assumed that the desirable readout range is a range between numbers "4" and "9" and that register numbers "6," "4," "3" and "5" are stored at such random order in the circulating memory 1, these register number "6," "4," "3" and "5" are successively read out in this order during the period T of the grand cycle of the circulating memory 1 into the register 2. A number "9" is set in the register 3 at the initial time of the period T from the terminal 9 as the upper limit of the readout range, and a number "3" smaller by "1" than the minimum number "4" of the readout range is set, as the lower limit of the readout range, at the same time in the register 4 from the terminal 10.

Under the above conditions, the number "6" is at first read out from the circulating memory 1 to the register 2 and compared with respective memory contents "M" and "L" of the registers 3 and 4 in the compare circuits 6 and 7. In this case, the content "R" (i.e.; the number "6") of the register 2 is smaller than the content "M" (i.e.; the number "9") of the register 3, and the content "R" is larger than the content "L" (i.e.; the number "3") of the register 4. Accordingly, both of the compare circuits 6 and 7 generate their outputs so as to open the gate circuit 11, and the memory content "R" being the number "6" is transferred to the register 3.

The next readout number "4" is similarly transferred to the register 3. However, succeeding numbers "3" and "4" cannot be passed through the gate circuit 11 since the compare circuits 6 and 7 do not generate simultaneously their outputs. Accordingly, the memory content "R" being the number "4" is transferred through the gate circuit 13 to the register 4 at the end of the period T of the grand cycle, and the number "4" transferred is then printed by the printing means 5. At the next period T of the grand cycle, the number "4" is set as the lower limit "L" in the register 4 as it is.

The above-mentioned operations are repeated for each period T of the grand cycle of the circulating memory 1. Accordingly, the respective contents "R," "M" and "L" of the registers 2, 3 and 4 are changed as shown in FIG. 2. As the result of the above operations, the registered numbers "6," "4," "3" and "5" are indicated by the means 5 in the order "4," "5" and "6". It will be understood that a readout order "3," "4," "5" and "6" is obtained by setting a number "2" in the register 4 at the initial time of the above readout operation.

The readout operation according to decreasing numerical order will now be described. In this case, the lower limit of the desirable readout range is set in the register 3 through the write-in terminal 9 at the initial time of the period T of the grand cycle of the circulating memory 1, and the upper limit of the desirable readout range is set in the register 4 through the write-in terminal 10 at the initial time of the readout operation. The upper limit of the desirable readout range is larger by "1" than the maximum number of the desirable readout range. Moreover, the compare circuit 6 generates its output when a number "R" stored in the register 2 is larger than a number "M" stored in the register 3. The compare circuit generates its output when a number "R" stored in the register 2 is smaller than a number "L" stored in the register 4. In these conditions, the registered numbers stored in the circulating memory 1 are read out from the register 4 to the means 5 according to the decreasing numerical order. Since these operations will be understood on the analogy of the detailed description for the readout operation in the increasing numerical order, details of the operation of this case are omitted.

The above operation is mainly described with respect to registered numbers of one figure. However, registered numerical information of plural figures can be also read out in a predetermined numerical order in the system of this invention.

While we have described particular embodiments of our invention, it will of course be understood that we do not wish our invention to be limited thereto, since many modifications and changes may be made and we, therefore, contemplate by the appended claims to cover all such modifications as fall within the true spirit and scope of our invention.

What we claim is:

1. A system for reading out numerical information in a predetermined numerical order from a circulating memory, the improvement comprising a first register for storing successively numerical signals read out from the circulating memory, a second register, a third register, means for establishing in a predetermined one of the second and third registers one of lower and upper end limits of a desirable readout range of the numerical information at the initial time of each period of grand cycle of the circulating memory, means for establishing in the other of the second and third registers the other of lower and upper end limits of the desirable readout range at the initial time of the readout operation of the system, a first gate means for transferring a numerical signal stored in the first register into said one of the second and third registers when the numerical signal stored in the first register is included within a range between numerical signals respectively stored in the second and third registers, a second gate means for transferring a numerical signal stored in said one of the second and third registers into the other of the second and third registers at the end of the period of the grand cycle, and a third gate means for reading out a numerical signal from the other of the second and third registers during a succeeding period of the grand cycle lasting after the end of the period of the grand cycle.

2. A system according to claim 1, in which a lower end limit of the desirable readout range is established in said one of the second and third registers, and an upper end limit of the desirable readout range is established in the other of the second and third registers, whereby the numerical information is read out in the decreasing numerical order from the other of the second and third registers through the third gate means.

3. A system according to claim 1, in which an upper end limit of the desirable readout range is established in said one of the second and third registers, and a lower end limit of the desirable readout range is established in the other of the second and third registers, whereby the numerical information is read out in the increasing numerical order from the other of the second and third registers through the third gate means.

References Cited

UNITED STATES PATENTS 3,405,397  10/1968  Jury _____ 340—173

TERRELL W. FEARS, Primary Examiner

U.S. Cl. X.R.

333—29